(12) United States Patent
Dribinsky et al.

(10) Patent No.: US 7,862,229 B2
(45) Date of Patent: Jan. 4, 2011

(54) TEMPERATURE-GRADIENT CANCELATION TECHNIQUE AND DEVICE

(75) Inventors: Alexander Dribinsky, Naperville, IL (US); Gregory P. Pucci, Batavia, IL (US); Yongyao Cai, Acton, MA (US); Mathew Varghese, Arlington, MA (US); Gary J. O'Brien, Chandler, AZ (US)

(73) Assignee: Memsic, Inc., Andover, MA (US)

( * ) Notice: Subject to any disclaimer, the term of this patent is extended or adjusted under 35 U.S.C. 154(b) by 347 days.

(21) Appl. No.: 12/229,525

(22) Filed: Aug. 22, 2008

(65) Prior Publication Data

US 2010/0045362 A1    Feb. 25, 2010

(51) Int. Cl.
*G01K 3/00* (2006.01)
(52) U.S. Cl. .................. 374/137; 374/112; 374/113; 374/114; 327/512
(58) Field of Classification Search ............. 374/137, 374/112–114; 327/513
See application file for complete search history.

(56) References Cited

U.S. PATENT DOCUMENTS

| | | | |
|---|---|---|---|
| 4,232,553 A | 11/1980 | Benedetto et al. | |
| 4,300,392 A | 11/1981 | Bloomer et al. | |
| 7,305,881 B2 | 12/2007 | Zhao et al. | |
| 2006/0179940 A1* | 8/2006 | Liu et al. ................. | 73/488 |
| 2009/0145226 A1* | 6/2009 | Cai ......................... | 73/514.09 |

* cited by examiner

*Primary Examiner*—Lisa M Caputo
*Assistant Examiner*—Mirellys Jagan
(74) *Attorney, Agent, or Firm*—Weingarten, Schurgin, Gagnebin & Lebovici LLP

(57) ABSTRACT

A system, device, and method for minimizing x-axis and/or y-axis offset shift due to internally produced as well as externally produced on chip temperature imbalances. At least one temperature gradient canceling device is disposed on a substrate including a temperature gradient sensitive device having at least one pair of sensors. Voltage signals generated by the temperature gradient canceling devices can be combined with voltage signals generated by each of the pair of sensors to account for the offset.

37 Claims, 4 Drawing Sheets

TEMPERATURE-GRADIENT CANCELATION TECHNIQUE AND DEVICE

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is related to the field of integrated circuits that are influenced by temperature gradients and, more particularly, to integrated circuits that include temperature gradient canceling features.

Although the present invention applies to integrated circuits whose performance can be affected deleteriously by temperature gradients, the invention will be described in terms of a thermal accelerometer. Those of ordinary skill in the art can appreciate the adaptability of the thermal accelerometer application to other applications such as flow sensors, pressure sensors, opamps, voltage references, supply regulators, and the like.

Conventional thermal accelerometers, which include a heating element and thermopile pairs to determine acceleration by measuring changes in temperature of a fluid, are themselves highly sensitive to temperature gradients across the integrated circuit ("chip"). Indeed, an acceleration sensing device often cannot differentiate between an acceleration signal and a temperature gradient, which the sensor may interpret as an acceleration signal. As a result, temperature gradients across the chip can produce an offset shift.

Internal or systemic temperature gradient conditions that are caused by the internal workings and normal operation of the chip can be addressed in manufacture. However, when the chip is integrated into a system, e.g., on a printed circuit board (PCB), heat-generating components proximate the accelerometer can also cause problems. For example, during system start-up and before thermal equilibrium has been reached, significant thermal gradients can result due to the sequential timing of start-up and the varying warm-up rates of the individual components and devices making up the system. Temperature gradients can also remain after start-up due to the proximity of the chip to heat-generating devices, to cooling mechanisms that cool unevenly, and the like. Heat generation of different devices may also change with time, for example a circuit that is enabled then disabled or vice versa, cooling fans turning on and off, motors operating or not operating, and so forth. Those of ordinary skill in the art know that this problem is not unique to thermal accelerometers but exits for many sensing device or system, e.g., a flow sensor, a pressure sensor, and the like, that uses temperature and temperature differentials.

Unfortunately, temperature gradients resulting from external elements and stimuli, e.g., due to environmental conditions, having to do with the PCB, and the like, cannot be compensated for in manufacture. More particularly, a generic chip can be used in a multiplicity of applications, whose system designs are unknown to the chip designer, but which can create unique operating environments. As a result of unique temperature gradient conditions in these applications, the thermal accelerometer will exhibit offsets that differ from the value it was set for at the factory.

FIG. 1 depicts a thermal acceleration sensor and FIG. 2 depicts a thermal accelerometer integrating the thermal acceleration sensor in accordance with U.S. Pat. No. 7,305,881 commonly assigned to MEMSIC, Inc. of Andover, Mass., the assignee of the present invention.

Referring to FIG. 1, the thermal acceleration sensor 101 includes a substantially planar substrate 102, a cavity 103 formed in the substrate 102, a heater element 104 suspended over the cavity 103, a first pair of temperature sensing elements 106a-106b disposed along the x-axis, and a second pair of temperature sensing elements 107a-107b disposed along the y-axis. The thermal acceleration sensor 101 further includes a fluid disposed in the cavity 103 to allow convective heat transfer to occur in the vicinity of the cavity 103.

Each temperature sensing element of the temperature sensing element pairs 106a-106b and 107a-107b is disposed at substantially equal distances from the heater element 104. Furthermore, the heater element 104 is operative to produce a temperature gradient within the fluid that is symmetrical in both the x- and y-direction when the device is at rest. Accordingly, the symmetrical temperature gradients along the x- and y-axes cause the differential temperature between the temperature sensing element pairs 106a-106b and 107a-107b to be zero when the thermal acceleration sensor 101 is at rest.

In the event an accelerating force is applied to the sensor 101, for example, in the x-direction, the temperature distribution shifts, thereby allowing a non-zero differential temperature proportional to the magnitude of the applied acceleration to be detected by the temperature sensing elements 106a and 106b. Similarly, in the event an accelerating force is applied to the sensor 101 in the y-direction, the temperature distribution shifts to allow a non-zero differential temperature proportional to the magnitude of the applied acceleration to be detected by the temperature sensing elements 107a-107b.

The thermal accelerometer 300 shown in FIG. 2 is structured and arrange to provide output voltages $V_{out,a}$ and $V_{out,b}$ representing magnitudes of acceleration in the directions of the x- and y-axes, respectively. The embodied thermal accelerometer 300 includes the thermal acceleration sensor 101 of FIG. 1, as well as heater control circuitry 318, amplification circuitry 314, and signal conditioning circuitry 360, which preferably are integrated on a single chip.

The foregoing design remains sensitive to thermal gradient along the sensitive (x- and y-) axes. More specifically, referring to FIG. 1, any temperature gradient along the North (N)-South (S) direction or axis produces an offset along the x-axis and any temperature gradient along the East (E)-West (W) direction or axis produces an offset along the y-axis.

Accordingly, it would be desirable to provide a high-precision sensor chip, such as a thermal accelerometer, to minimize the x-axis and/or y-axis offset shift, i.e., the sensitivity to a temperature gradient, due to internally produced as well as externally produced on chip temperature imbalances.

BRIEF SUMMARY OF THE INVENTION

A thermal accelerometer and related circuitry for minimizing x-axis and/or y-axis offset shift due to internally produced as well as externally produced on chip temperature imbalances are disclosed. The thermal accelerometer includes a thermal acceleration sensor, amplification circuitry, signal conditioning circuitry, and a controller. The thermal acceleration sensor includes a heating element, a first pair of acceleration sensing thermopiles arranged on opposing sides of the sensor, and a second pair of acceleration sensing thermopiles arranged on opposing side of the sensor that are orthogonal to the those on which the first pair of acceleration sensing thermopiles are arranged.

The thermal accelerometer further includes a temperature gradient canceling system that has at least one temperature gradient canceling device. The at least one temperature gradient canceling device can be positioned at any angle with respect to the first and second pairs of acceleration sensing thermopiles to best sense a temperature gradient. For example, one temperature gradient canceling device could be disposed parallel to the first pair of acceleration sensing thermopiles and another temperature gradient canceling device could be disposed parallel to the second pair of acceleration sensing thermopiles.

Voltage signals generated by each of the gradient canceling devices can be combined in series with voltage signals generated by each of the pair of acceleration sensing thermopiles. The joint signal can be amplified in the amplification circuitry before the combined signal is conditioned by the signal conditioning circuitry. Alternatively, voltage signals generated by each of the gradient canceling devices can be amplified separately then the amplified individual signals can be combined with the voltage signals from each of the pairs of acceleration sensing thermopiles in a correction circuit. The corrected signal can be further conditioned by the signal conditioning circuitry.

BRIEF DESCRIPTION OF THE SEVERAL VIEWS OF THE DRAWINGS

The invention will be better understood by reference to the following more detailed description and accompanying drawing in which.

DETAILED DESCRIPTION OF THE INVENTION

Figure 1:
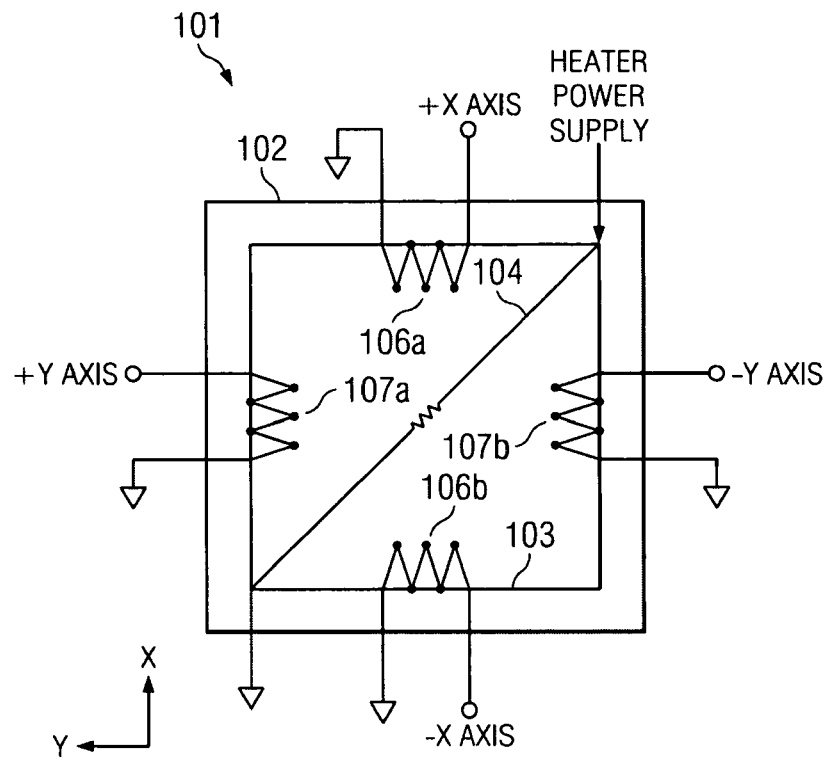
FIG. 1 shows a thermal acceleration sensor in accordance with the prior art.
Figure 3:
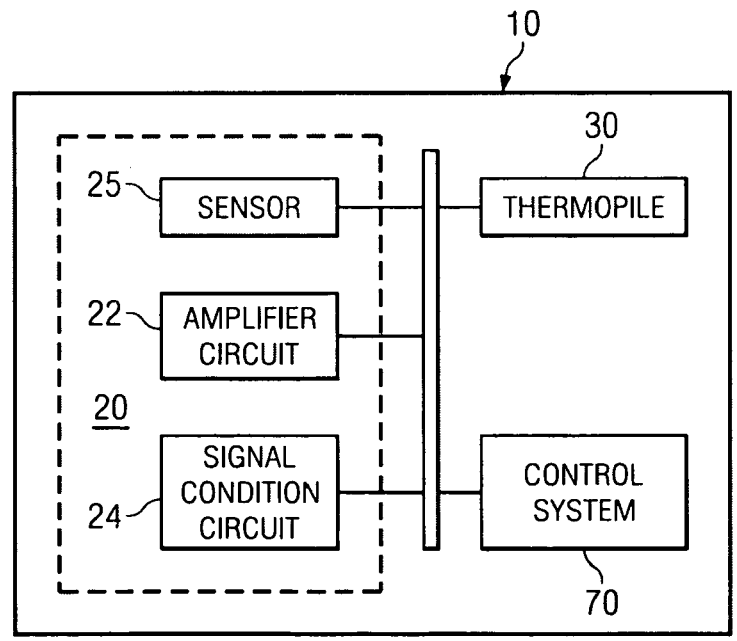
FIG. 3 shows a thermal accelerometer having gradient canceling thermopiles in accordance with the present invention.
Figure 2:
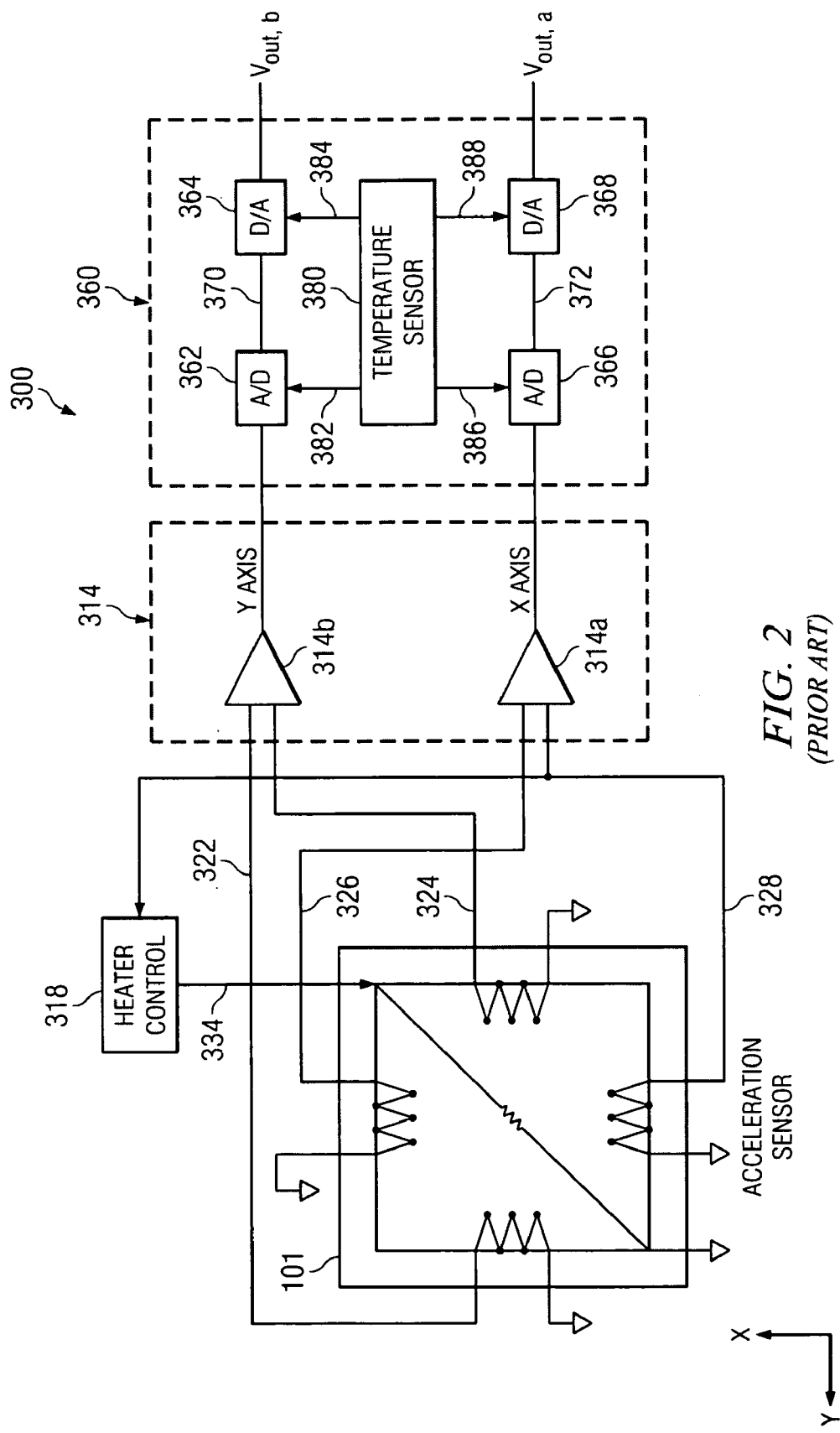
FIG. 2 shows the thermal acceleration sensor of FIG. 1 used in a thermal accelerometer in accordance with the prior art.

A device, a system, and a method for detecting and compensating for offset shift in at least one of two orthogonal directions due to externally produced and/or internally produced on chip temperature gradients are disclosed. As shown in the block diagram in FIG. 3, the system 10 includes a thermal accelerometer 20, a temperature gradient canceling system 30, and a controller 70. The thermal accelerometer 20 includes a thermal acceleration sensor 25, amplification circuitry 22, and signal conditioning circuitry 24. The thermal accelerometer 20, the amplification circuitry 22, the signal conditioning circuitry 24, and thermal acceleration sensor 25 are described in detail in U.S. Pat. No. 7,305,881, which is incorporated in its entirety by reference. The temperature gradient canceling system 30 and controller 70 are described in greater detail below.

Temperature Gradient Canceling System

Although the temperature gradient canceling system and devices will be described in terms of a plurality of thermopiles, temperature gradients can also be measured using diodes, thermistors, thermocouples, Wheatstone bridges, bipolar junction transistors, and the like, which are equally covered by this disclosure. Indeed, any device that can produce a voltage that is a function of temperature is included herein. Those skilled in the art can appreciate that the invention can be embodied with temperature sensitive devices.

Figure 4:
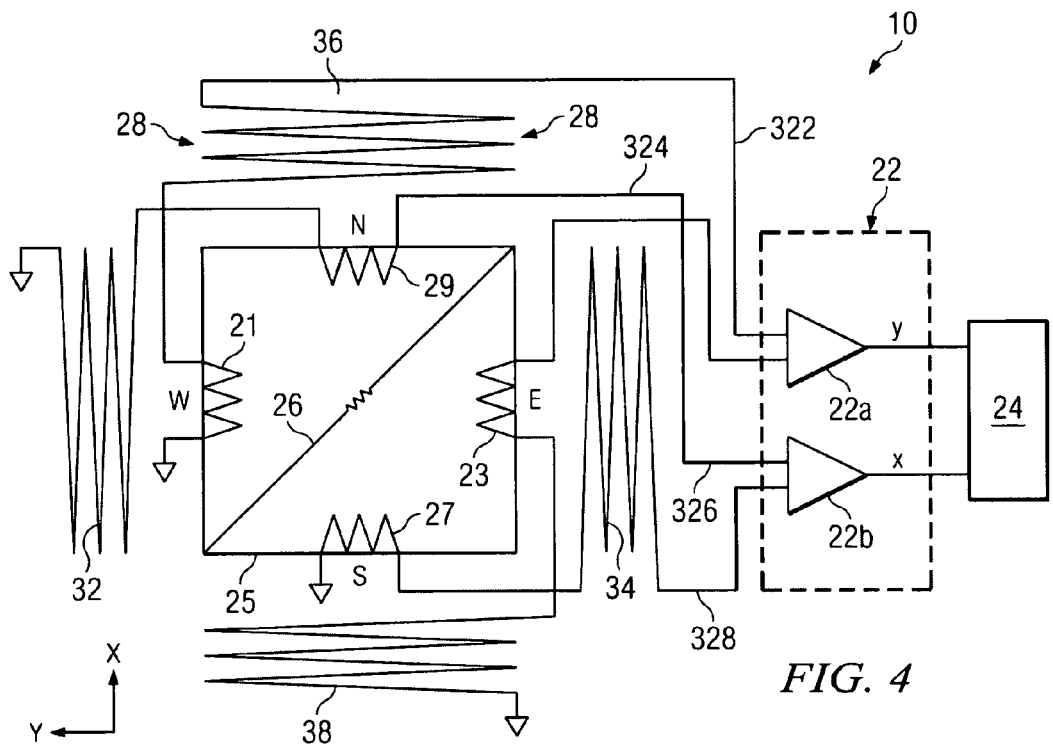
FIG. 4 shows a first thermal accelerometer having four gradient canceling thermopiles in accordance with the present invention.

FIG. 4 shows an illustrative embodiment of a thermal acceleration sensor 25 in combination with a plurality of thermopile pairs 32-34 and 36-38. In pertinent part, the thermal acceleration sensor 25 includes a heating element 26 and pairs of opposing acceleration sensing thermopiles 21-23 and 27-29. As shown in FIG. 4, a first pair of acceleration sensing thermopiles 21-23 is structured and arranged, respectively, on the west-side (W) and east-side (E) of the sensor 25. Each acceleration sensing thermopile of the first pair of acceleration sensing thermopiles 21-23 generates input signals to a first (y-axis) amplifier 22a. A second pair of acceleration sensing thermopiles 27-29 is structured and arranged, respectively, on the south-side (S) and the north-side (N) of the sensor 25. Each acceleration sensing thermopile of the second pair of acceleration sensing thermopiles 27-29 generates input signals to a second (x-axis) amplifier 22b.

Each of a first pair of the gradient canceling thermopiles 32-34 is electrically coupled in series to one of the second pair of acceleration sensing thermopiles 27-29 as well as to the second (x-axis) amplifier 22b. Each of the first pair of gradient canceling thermopiles 32-34 is disposed, respectively, along the west-side (W) and along the east-side (E) of the thermal acceleration sensor 25, orthogonally or substantially orthogonally to the second pair of acceleration sensing thermopiles 27-29 to which they are serially coupled. Thermopiles 32 and 34 are adapted to sense a thermal gradient in the North (N)-South (S) direction or axis, to compensate for acceleration offset shift in the x-axis. Based on the magnitude of the sensed thermal gradient, each of the thermopiles 32 and 34 generates a differential voltage signal, which is added to the voltage signal generated by the acceleration sensing thermopiles 27 and 29.

In like fashion, each of a second pair of the gradient canceling thermopiles 36-38 is electrically coupled in series to one of the first pair of acceleration sensing thermopiles 21 and 23 as well as to the first (y-axis) amplifier 22a. Each of the second pair of the gradient canceling thermopiles 36-38 is disposed, respectively, along the north-side (N) and the south-side (S) of the thermal acceleration sensor 25, orthogonally or substantially orthogonally to the first pair of acceleration sensing thermopiles 21-23 to which they are serially coupled. Thermopiles 36 and 38 are adapted to sense a thermal gradient in the East (E)-West (W) direction or axis, to compensate for acceleration offset shift in the y-axis. Based on the magnitude of the sensed thermal gradient, each of the thermopiles 36 and 38 generates a differential voltage signal, which is added to the voltage signal generated by the acceleration sensing thermopiles 21 and 23.

Advantageously, by electrically coupling the first pair of gradient canceling thermopiles 32-34 in series with the second pair of acceleration-sensing thermopiles 27-29 and by electrically coupling the second pair of gradient canceling thermopiles 36-38 in series with the first pair of acceleration sensing thermopiles 21-23, offset shift compensation is possible without requiring additional amplifiers and/or having to add a correction signal to the output signals $V_{out,a}$ and $V_{out,b}$ generated by the amplification circuitry 22.

In the presence of a thermal gradient, the gradient canceling thermopiles 32, 34, 36, and 38 are adapted to generate a voltage signal that is proportional to the temperature difference between their ends or tips 28. If the gradient canceling thermopiles 32, 34, 36, and 38 are relatively long, the distance between the tips 28 is greater, hence, the temperature difference between the tips 28 will be larger and each will generate more voltage. The opposite is also true: if the gradient canceling thermopiles 32, 34, 36, and 38 are relatively short, the distance between the tips 28 is less, hence, the temperature difference between the tips 28 will be smaller and each will generate less voltage. The voltage signal generated by the temperature gradient canceling thermopiles 32, 34, 36, and 38 is a temperature differential correction voltage, which is added to the voltage signal from the acceleration thermopiles 21, 23, 27, and 29 whenever the temperature gradient across the chip is not uniform.

For greater sensitivity, additional individual gradient canceling thermocouples (not shown) can be added in series to the thermopiles, which will increase the voltage. As a result, those of ordinary skill in the art can appreciate that the distance between the tips 28, i.e., the length of the thermocouples and thermopiles, as well as the number of thermocouples arranged in a thermopile enable the designer to compensate for any expected temperature gradient.

Figure 5:
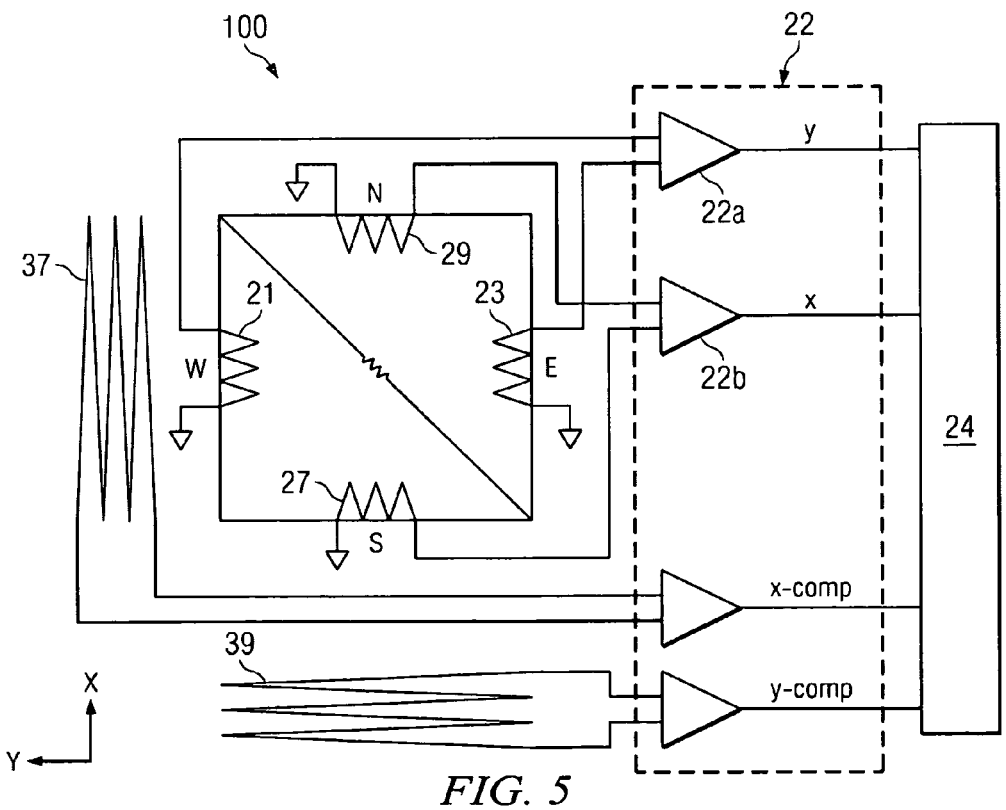
FIG. 5 shows a second thermal accelerometer having two gradient canceling thermopiles in accordance with the present invention.

Referring to FIG. 5, an alternative temperature gradient canceling system 100 is shown. The system 100 includes a thermal acceleration sensor 25 in combination with an x-direction, gradient compensating thermopile 37 and a y-direction, gradient compensating thermopile 39. As above, the thermal acceleration sensor 25 includes a heating element 26 and pairs of opposing acceleration sensing thermopiles 21-23 and 27-29. The first pair of acceleration sensing thermopiles 21-23 is structured and arranged on opposite sides of the sensor 25 with each providing input signals to a first (y-axis) amplifier 22a while the second pair of acceleration sensing thermopiles 27-29 are structured and arranged on opposite sides of the sensor 25 with each providing input signals to a second (x-axis) amplifier 22b.

A first gradient canceling thermopile 37 is electrically coupled to an x-axis temperature gradient compensation amplifier 36a and a second gradient canceling thermopile 39 is electrically coupled to a y-axis temperature gradient compensation amplifier 36b. The first gradient canceling thermopile 37 is disposed along either of the east-side (E) or the west-side (W) of the sensor 25, orthogonally or substantially orthogonally to the x-axis acceleration sensing thermopiles 27 and 29. The first gradient canceling thermopile 37 is adapted to sense a thermal gradient in the North (N)-South (S) direction or axis, to compensate for acceleration offset shift in the x-axis. The second gradient canceling thermopile 39 is disposed along either of the north-side (N) or the south-side (S) of the sensor 25, orthogonally or substantially orthogonally to the y-axis acceleration sensing thermopiles 21 and 23. The second gradient canceling thermopile 39 is adapted to sense a thermal gradient in the East (E)-West (W) direction or axis, to compensate for acceleration offset shift in the y-axis.

Those of ordinary skill in the art can appreciate that temperature gradient canceling thermopiles do not have to be disposed in pairs or necessarily horizontally or vertically or orthogonally to one another. Indeed, the temperature gradient canceling thermopile(s) can, instead, be selectively oriented at some angle, e.g., 45-degree angle, to the x- and y-axes. Such an arrangement is particularly useful if the temperature gradient consistently appears or is known to appear along the orientation of the thermopile. As a result, a single thermopile (not shown) can be used to account for temperature gradients across the sensor 25.

Amplification and Signal Processing Circuitry

The amplification circuitry 22 and signal processing circuitry 24 for the first embodiment of the system 10 can be the same as that described in U.S. Pat. No. 7,305,881 and as shown in FIG. 4. More specifically, amplification circuitry 22 can include y-axis and x-axis instrumentation amplifiers 22a and 22b, respectively. The thermal acceleration sensor 25 is adapted to provide differential temperature signals indicative of applied acceleration in the x- and y-directions to the instrumentation amplifiers 22b, 22a while gradient canceling thermopiles 32, 34, 36, and 38 are adapted to provide gradient signals indicative of a temperature gradient differential between the ends or tips 28 of each discrete gradient canceling thermopile 32, 34, 36, and 38.

Figure 6A:
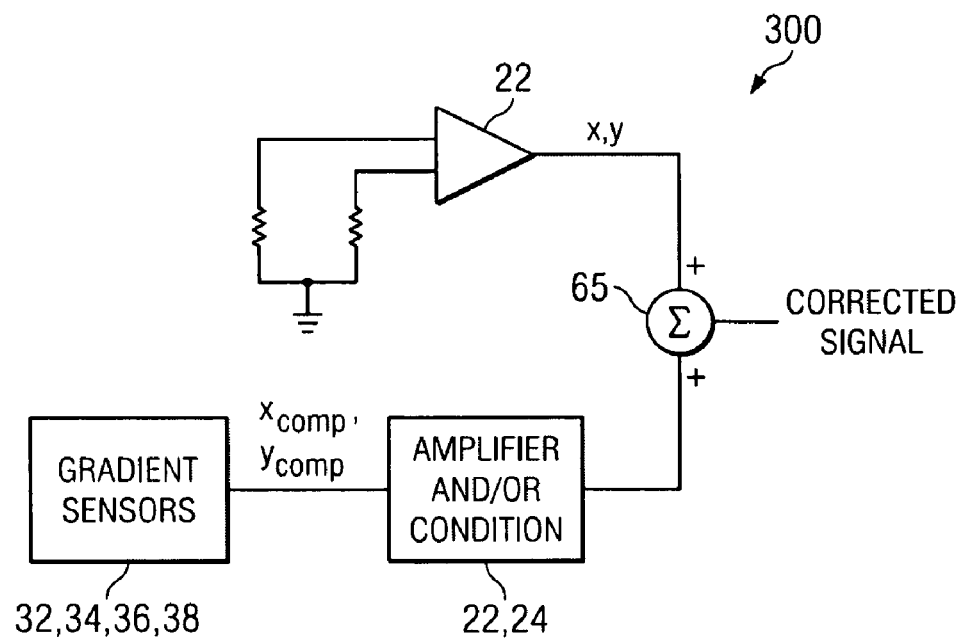
FIG. 6A shows signaling conditioning circuitry for analog signals.
Figure 6B:
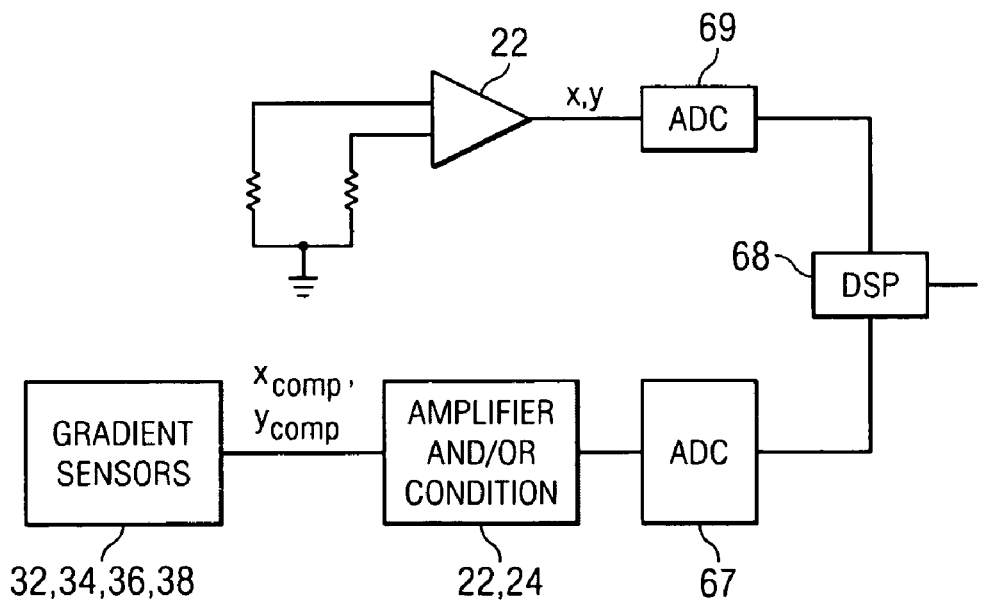
FIG. 6B shows signal conditioning circuitry for digital applications.

FIG. 6A and FIG. 6B show illustrative amplification 22 and signal conditioning circuitry 24 for instances in which the output signals from first and second temperature gradient canceling thermopiles 37 and 39 are introduced, respectively, into an x-axis temperature gradient compensation amplifier 36b and a y-axis temperature gradient compensation amplifier 36a. FIG. 6A shows an illustrative analog summation circuit 60 and FIG. 6B shows a digital application 65.

In each figure, the x-axis temperature gradient compensation amplifier 36b is adapted to generate an x-direction gradient compensation signal (x-comp) based on the temperature gradient signal from the first gradient canceling thermopile 37 and the y-axis temperature gradient compensation amplifier 36a is adapted to generate a y-direction gradient compensation (y-comp) signal based on the temperature gradient signal from the second gradient canceling thermopile 39. After amplification, the x- and y-direction gradient compensation signals are condition in a signal conditioner 64.

For analog signals, a summer 65 sums the outputs from the x-axis temperature gradient compensation amplifier 36a and the x-axis amplifier 22b and sums the outputs from the y-axis temperature gradient compensation amplifier 36b and the y-axis amplifier 22a. Summation of the x-direction gradient compensation signal (x-comp) with the output signal from the x-axis amplifier 22b will adjust or correct the x-axis output signal to account for temperature gradient imbalances. Likewise, summation of the y-direction gradient compensation signal (y-comp) with the output signal from the y-axis amplifier 22a will adjust or correct the y-axis output signal to account for temperature gradient imbalances.

For a digital application, outputs from the x-direction instrumentation amplifier 36a and the x-axis amplifier 22b are subject to analog-to-digital conversion using analog-to-digital converters 69 and 67, respectively, and outputs from the y-direction instrumentation amplifier 36b and the y-axis amplifier 22a are also subject to analog-to-digital conversion using analog-to-digital converters 69 and 67, respectively. Once converted to a digital form, digital signal processing can be performed on the signal using a digital signal processor 68. Summation of the x-direction gradient compensation signal (x-comp) with the output signal from the x-axis amplifier 22b will adjust or correct the x-axis output signal to account for temperature gradient imbalances. Likewise, summation of the y-direction gradient compensation signal (y-comp) with the output signal from the y-axis amplifier 22a will adjust or correct the y-axis output signal to account for temperature gradient imbalances.

Controller

The controller 70 can be a hard-wired circuit or a microprocessor that is structured and arranged to control operation of and the flow of data from and between the thermal accelerometer 20, the temperature gradient canceling thermopiles 30, as well as the amplification and signal conditioning circuitry. When the controller 70 is a microprocessor, the controller 70 can include memory such as read-only memory (ROM) and random access memory (RAM).

Although the invention has been described as using voltages generated by temperature gradient canceling devices to cancel the deleterious effects of a temperature gradient in connection with integrated circuits, those of ordinary skill in the art can appreciate that the system could instead be adapted to compensate for temperature differences. For example, the system can include a servo-controlled regulation loop that includes a controller, at least one additional heating/cooling element. The servo-controlled regulation loop and controller can be structured and arranged to drive the temperature gradient (and, therefore, the temperature-dependent voltage differential) to zero by selectively activating the heating/cooling element. Heat from the heating element can, thus, be used to cancel out or counteract externally-induced temperature effects.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

The invention claimed is:

1. A system for cancelling deleterious effects to operation of an integrated circuit due to temperature imbalances or gradients, the system comprising:
   a temperature gradient sensitive device having at least one pair of sensors that are disposed on a substrate;
   a temperature gradient canceling system; and
   a controller that is electrically coupled to the temperature gradient sensitive device and the temperature gradient canceling system,
   wherein the temperature gradient canceling system includes a first temperature gradient canceling device that is disposed along a first axis of the substrate for detecting or compensating for offset shift along a second axis of the substrate that is orthogonal to the first axis and a second temperature gradient canceling device that is disposed along the second axis for detecting or compensating for offset shift along the first axis.

2. A system for cancelling deleterious effects to operation of an integrated circuit due to temperature imbalances or gradients, the system comprising:
   a temperature gradient sensitive device having a first pair and a second pair of sensors that are disposed orthogonally with respect to each other on a substrate;
   a temperature gradient canceling system including a first temperature gradient canceling device and a second temperature gradient canceling device, the first temperature gradient canceling device being disposed parallel or substantially parallel to and along a first axis for detecting or compensating for offset shift along a second axis that is orthogonal to the first axis and a second temperature gradient canceling device that is disposed parallel to or substantially parallel to and along the second axis for detecting or compensating for offset shift along the first axis; and
   a controller that is electrically coupled to the temperature gradient sensitive device and the temperature gradient canceling system.

3. The system as recited in claim 1, wherein the temperature gradient canceling device is selected from the group consisting of at least one thermocouple, at least one thermopile, at least one diode, at least one Wheatstone bridge, at least one bipolar junction transistor or at least one thermistor.

4. The system as recited in claim 1, wherein the first temperature gradient canceling device is electrically and serially coupled to and oriented orthogonally or substantially orthogonally with respect to the second pair of sensors and the second temperature gradient canceling device is electrically and serially coupled to and oriented orthogonally or substantially orthogonally with respect to the first pair of sensors.

5. The system as recited in claim 1, wherein the integrated circuit is selected from the group consisting of a thermal accelerometer, a flow sensor, a pressure sensor, an opamp, a voltage reference, a supply regulator or a thermal accelerometer.

6. The system as recited in claim 1 further comprising:
   a servo-regulation loop, including at least one heating/cooling element, for driving any detected temperature gradient to zero,
   wherein the controller is further adapted to selectively control the at least one heating/cooling element to counteract any externally-induced temperature gradients and their effects.

7. The system as recited in claim 1, wherein the temperature gradient canceling system includes a temperature gradient canceling device that is disposed transversely at some angle between each sensor of the at least one pair of sensors.

8. The system as recited in claim 1, wherein the temperature gradient canceling system includes a third temperature gradient canceling device that is disposed along the first axis in parallel with the first temperature gradient canceling device and a fourth temperature gradient canceling device that is disposed along the second axis in parallel with the second temperature gradient canceling device.

9. The system as recited in claim 8, wherein the first and the third temperature gradient canceling devices are disposed on or along opposite sides of the substrate and the second and the fourth temperature gradient canceling device are disposed on or along opposite sides of said substrate.

10. The system as recited in claim 8, wherein the first and the third temperature gradient canceling devices are electrically and serially coupled to the second pair of sensors.

11. The system as recited in claim 10, wherein at least one of the first temperature gradient canceling device, the third temperature gradient canceling device, and the second pair of sensors is electrically coupled to a first axis instrumentation amplifier.

12. The system as recited in claim 8, wherein the second and the fourth temperature gradient canceling devices are electrically and serially coupled to the first pair of sensors.

13. The system as recited in claim 12, wherein at least one of the second temperature gradient canceling device, the fourth temperature gradient canceling device, and the first pair of sensors is electrically coupled to a second axis instrumentation amplifier.

14. An integrated circuit comprising:
   a substrate; and
   a device for reducing deleterious effects to operation of said integrated circuit due to temperature imbalances or gradients, the device including a temperature gradient sensitive device having at least one pair of sensors that are disposed on a substrate and a temperature gradient canceling system that includes a first temperature gradient canceling device that is disposed along a first axis of the substrate for detecting or compensating for offset shift along a second axis of the substrate that is orthogonal to the first axis and a second temperature gradient canceling device that is disposed along the second axis for detecting or compensating for offset shift along the first axis.

15. The circuit as recited in claim 14, wherein the temperature gradient canceling device is selected from the group consisting of at least one thermocouple, at least one thermopile, at least one diode, at least one Wheatstone bridge, at least one bipolar junction transistor or at least one thermistor.

16. The circuit as recited in claim 14, wherein the temperature gradient canceling system includes a temperature gradient canceling device that is disposed transversely at some angle between each sensor of the at least one pair of sensors.

17. The circuit as recited in claim 14, wherein the integrated circuit is selected from the group consisting of a flow sensor, a pressure sensor, an opamp, a voltage reference, a supply regulator or a thermal accelerometer.

18. The circuit as recited in claim 14, further comprising:
a servo-regulation loop, including at least one heating/cooling element, for driving any detected temperature gradient to zero; and
a controller that is adapted to selectively control the at least one heating/cooling element to counteract any externally-induced temperature gradients and their effects.

19. The circuit as recited in claim 14, wherein the temperature gradient canceling system includes a first temperature gradient canceling device that is disposed in parallel with a first pair of sensors along a first axis and a second temperature gradient canceling device that is disposed in parallel with a second pair of sensors along a second axis.

20. The circuit as recited in claim 19, wherein the first axis is orthogonal or substantially orthogonal to the second axis.

21. The circuit as recited in claim 19, wherein the temperature gradient canceling system includes a third temperature gradient canceling device that is disposed along the first axis in parallel with the first temperature gradient canceling device and a fourth temperature gradient canceling device that is disposed along the second axis in parallel with the second temperature gradient canceling device.

22. The circuit as recited in claim 21, wherein the first and the third temperature gradient canceling devices are disposed on or along opposite sides of the substrate and the second and the fourth temperature gradient canceling device are disposed on or along opposite sides of said substrate.

23. The circuit as recited in claim 21, wherein the first and the third temperature gradient canceling devices are electrically and serially coupled to the second pair of sensors.

24. The circuit as recited in claim 23, wherein at least one of the first temperature gradient canceling device, the third temperature gradient canceling device, and the second pair of sensors is electrically coupled to a first axis instrumentation amplifier.

25. The circuit as recited in claim 21, wherein the second and the fourth temperature gradient canceling devices are electrically and serially coupled to the first pair of sensors.

26. The circuit as recited in claim 25, wherein at least one of the second temperature gradient canceling device, the fourth temperature gradient canceling device, and the first pair of sensors is electrically coupled to a second axis instrumentation amplifier.

27. A method for reducing deleterious effects to an integrated circuit due to temperature imbalances, the integrated circuit having at least one pair of temperature gradient sensitive sensors disposed on a substrate, the method comprising:
selectively disposing a first temperature gradient canceling device and a second temperature gradient canceling device on the substrate, the first temperature gradient canceling device being disposed parallel or substantially parallel to and along a first axis for detecting or compensating for offset shift along a second axis that is orthogonal to the first axis and a second temperature gradient canceling device that is disposed parallel to or substantially parallel to and along the second axis for detecting or compensating for offset shift along the first axis;
summing output generated by each temperature gradient canceling device; and
compensating for temperature sensitive outputs from the at least one pair of temperature gradient sensitive sensors using the output generated by the temperature gradient canceling devices.

28. The method as recited in claim 27 further comprising:
driving to zero any non-zero temperature gradient detected by the at least one pair of temperature gradient sensitive sensors by adding heat to or removing heat from selective regions of the integrated circuit to counteract any externally-induced temperature gradients.

29. The method as recited in claim 27, wherein selectively disposing the at least one temperature gradient canceling device on the integrated circuit includes:
disposing a first temperature gradient canceling device in parallel with a first pair of temperature gradient sensitive sensors along a first axis; and
disposing a second temperature gradient canceling device in parallel with a second pair of temperature gradient sensitive sensors along a second axis.

30. The method as recited in claim 29, wherein summing output generated by the at least one temperature gradient canceling device includes:
summing output generated by the first temperature gradient canceling device with output generated by the second pair of temperature gradient sensitive sensors to reduce temperature effects along the second axis; and
summing output generated by the second temperature gradient canceling device with output generated by the first pair of temperature gradient sensitive sensors to reduce temperature effects along the first axis.

31. The method as recited in claim 27 further comprising:
disposing a third temperature gradient canceling device along the first axis in parallel with the first temperature gradient canceling device; and
disposing a fourth temperature gradient canceling device along the second axis in parallel with the second temperature gradient canceling device.

32. The method as recited in claim 31, wherein the first and the third temperature gradient canceling devices are disposed on or along opposite sides of the substrate and the second and the fourth temperature gradient canceling device are disposed on or along opposite sides of said substrate.

33. The method as recited in claim 31, wherein summing output generated by the at least one temperature gradient canceling device includes:
summing outputs generated by the first and the third temperature gradient canceling devices with output generated by the second pair of temperature gradient sensitive sensors to reduce temperature effects along the second axis; and
summing outputs generated by the second and the fourth temperature gradient canceling devices with output generated by the first pair of temperature gradient sensitive sensors to reduce temperature effects along the first axis.

34. The method as recited in claim 31 further comprising electrically and serially coupling the first and the third temperature gradient canceling devices to the second pair of temperature gradient sensitive sensors.

35. The method as recited in claim 34, further comprising:
electrically coupling at least one of the first temperature gradient canceling device, the third temperature gradient canceling device, and the second pair of temperature gradient sensitive sensors to a first axis instrumentation amplifier.

36. The method as recited in claim 31, further comprising electrically and serially coupling the second and the fourth temperature gradient canceling devices to the first pair of temperature gradient sensitive sensors.

37. The method as recited in claim 36, further comprising:
electrically coupling at least one of the second temperature gradient canceling device, the fourth temperature gradient canceling device, and the first pair of temperature gradient sensitive sensors to a second axis instrumentation amplifier.

* * * * *

UNITED STATES PATENT AND TRADEMARK OFFICE
CERTIFICATE OF CORRECTION

PATENT NO. : 7,862,229 B2  
APPLICATION NO. : 12/229525  
DATED : January 4, 2011  
INVENTOR(S) : Alexander Dribinsky et al.

It is certified that error appears in the above-identified patent and that said Letters Patent is hereby corrected as shown below:

Column 8, claim 3, line 4, "claim 1" should read --claim 2--;

Column 8, claim 5, line 16, "claim 1" should read --claim 2--;

Column 8, claim 6, line 21, "claim 1" should read --claim 2--;

Column 8, claim 7, line 29, "claim 1" should read --claim 2--; and

Column 8, claim 8, line 33, "claim 1" should read --claim 2--.

Signed and Sealed this
Fourteenth Day of August, 2012

David J. Kappos
*Director of the United States Patent and Trademark Office*